United States Patent [19]

Clausen

[11] Patent Number: 5,577,796
[45] Date of Patent: Nov. 26, 1996

[54] STRUCTURAL BEAM AND METHOD OF MANUFACTURE THEREOF

[75] Inventor: Edvin L. Clausen, Tønder, Denmark

[73] Assignee: Norsk Hydro a.s., Oslo, Norway

[21] Appl. No.: 480,503

[22] Filed: Jun. 7, 1995

Related U.S. Application Data

[63] Continuation of Ser. No. 204,212, filed as PCT/NO92/00142 filed Sep. 4, 1992, abandoned.

[30] Foreign Application Priority Data

Sep. 6, 1991 [NO] Norway .................. 913528

[51] Int. Cl.⁶ ..................... B62D 25/04; B60R 19/02
[52] U.S. Cl. .................. 296/202; 296/205; 293/102; 29/897.2; 72/367
[58] Field of Search ................ 204/212; 296/202, 296/203, 205, 188, 189; 138/173, 177, 178, 119, DIG. 4, DIG. 11; 29/890.053, 897.2, 897.35; 72/367, 369; 293/102

[56] References Cited

U.S. PATENT DOCUMENTS

| | | | |
|---|---|---|---|
| 910,192 | 1/1909 | Grouvelle et al. | 138/177 X |
| 927,170 | 7/1909 | Ruggles et al. | 138/173 X |
| 1,081,076 | 12/1913 | Wright | 138/173 |
| 1,123,616 | 1/1915 | Stewart | 72/367 |
| 1,696,251 | 12/1928 | Penny | 72/369 |
| 1,729,663 | 10/1929 | Martin | 296/30 |
| 1,789,972 | 1/1931 | Frahm et al. | 138/173 |
| 1,924,734 | 8/1933 | Brown | 138/177 X |
| 1,928,009 | 9/1933 | Dornier | 138/177 |
| 1,963,057 | 6/1934 | Wilcox | 138/173 X |
| 2,085,829 | 7/1937 | Rogers | 29/897.35 |
| 2,205,893 | 6/1940 | Unger | 72/367 |
| 3,042,099 | 7/1962 | Neely | 72/369 |
| 3,450,193 | 6/1969 | Wolfe, Jr. | 138/173 X |
| 3,698,224 | 10/1972 | Saytes | 29/897.35 X |
| 3,848,886 | 11/1974 | Feuster et al. | 296/189 X |
| 4,049,082 | 9/1977 | Reid | 72/367 X |
| 4,095,450 | 6/1978 | Opland et al. | 72/367 X |
| 4,230,252 | 10/1980 | Meyer et al. | 72/367 X |
| 4,527,411 | 7/1985 | Shinosaki et al. | 72/369 X |
| 4,714,287 | 12/1987 | Merkle | 293/102 |
| 4,986,597 | 1/1991 | Clausen | 291/205 |
| 5,033,593 | 7/1991 | Kazuhito | 296/189 X |
| 5,058,266 | 10/1991 | Knoll | 29/890.049 |
| 5,066,064 | 11/1991 | Garnweidner | 296/189 X |
| 5,080,410 | 1/1992 | Stewart et al. | 293/102 |
| 5,080,412 | 1/1992 | Stewart et al. | 293/154 X |
| 5,093,990 | 3/1992 | Klippel | 296/188 X |
| 5,096,254 | 3/1992 | Sparke | 296/202 X |
| 5,297,415 | 3/1994 | Hendricks | 72/369 |
| 5,306,058 | 4/1994 | Sturrus et al. | 293/122 X |
| 5,338,100 | 8/1994 | Rees | 297/452.1 |
| 5,382,071 | 1/1995 | Enning et al. | 296/203 |
| 5,398,989 | 3/1995 | Winter et al. | 296/203 |
| 5,429,574 | 7/1995 | Murakami | 138/177 |

FOREIGN PATENT DOCUMENTS

| | | | |
|---|---|---|---|
| 441281 | 8/1912 | France | 138/173 |
| 594310 | 9/1925 | France | 296/29 |
| 689153 | 1/1930 | France | 138/173 |
| 1107176 | 5/1961 | Germany . | |
| 2509351 | 9/1975 | Germany | 296/189 |
| 2750744 | 5/1979 | Germany | 296/188 |
| 3144844 | 6/1982 | Germany . | |
| 4139303 | 6/1992 | Germany . | |
| 256226 | 10/1988 | Japan | 72/369 |
| 5065077 | 3/1993 | Japan | 296/194 |
| 1156929 | 5/1985 | U.S.S.R. | 296/188 |
| 90/02680 | 3/1990 | WIPO . | |
| 91/10582 | 7/1991 | WIPO . | |
| 92/11158 | 7/1992 | WIPO . | |

*Primary Examiner*—Dennis H. Pedder
*Attorney, Agent, or Firm*—Wenderoth, Lind & Ponack

[57] ABSTRACT

A structural beam, particularly for use as a door pillar or a bumper of a motor vehicle, includes a one-piece elongated extruded member formed of a light metal. The member has therethrough an elongated, laterally enclosed cavity defined by elongated side walls including at least two generally parallel side walls. A deformation pressure is applied to walls extending generally transverse to the two side walls, with the result that there occurs controlled folding of the two side walls with the formation therein of folds that extend parallel to the direction of elongation of the member. Thus, the cross-sectional area of the cavity through the member is reduced.

40 Claims, 4 Drawing Sheets

STRUCTURAL BEAM AND METHOD OF MANUFACTURE THEREOF

This application is a continuation of now abandoned application, Ser. No. 08/204,212, filed as PCT/NO92/00142 filed Sep. 4, 1992.

BACKGROUND OF THE INVENTION

The present invention relates to structural members for use in a vehicle frame and more particularly to elongated structural beams and to a method of manufacturing such members.

A so-called space frame includes a plurality of elongated structural members joined directly together or by means of cast connecting pieces to provide a skeleton forming the total combined body support and lower frame (chassis) of a motor vehicle. In order to satisfy various requirements with regard to strength and shape (outer configuration) of the structural members, e.g. door pillars or vertical posts of the frame, the pillars conventionally are provided as spot welded deep drawn steel plates composed of two or more components to form the desired configuration with auxiliary or additional features and functions. In the case of door pillars (posts) the shape customarily has a broader lower section and a narrower upper section of a window area.

SUMMARY OF THE INVENTION

It is therefore an object of the present invention to provide a novel unitary structural beam having desired variations in cross-sectional configuration along its longitudinal axis, i.e. longitudinally of the beam.

Another object of the invention is to provide a novel low cost method of manufacturing structural beams, eliminating the use of time-consuming welding or working operations.

BRIEF DESCRIPTION OF THE DRAWINGS

These and other objects and features of the present invention are achieved by provision of a structural beam and method of manufacture thereof as discussed in the following description of preferred embodiments, with reference to the accompanying drawings, wherein:

FIG. 5 is a cross-sectional view of an alternative configuration of the beam of FIG. 4a.

DETAILED DESCRIPTION OF THE INVENTION

Figure 1:
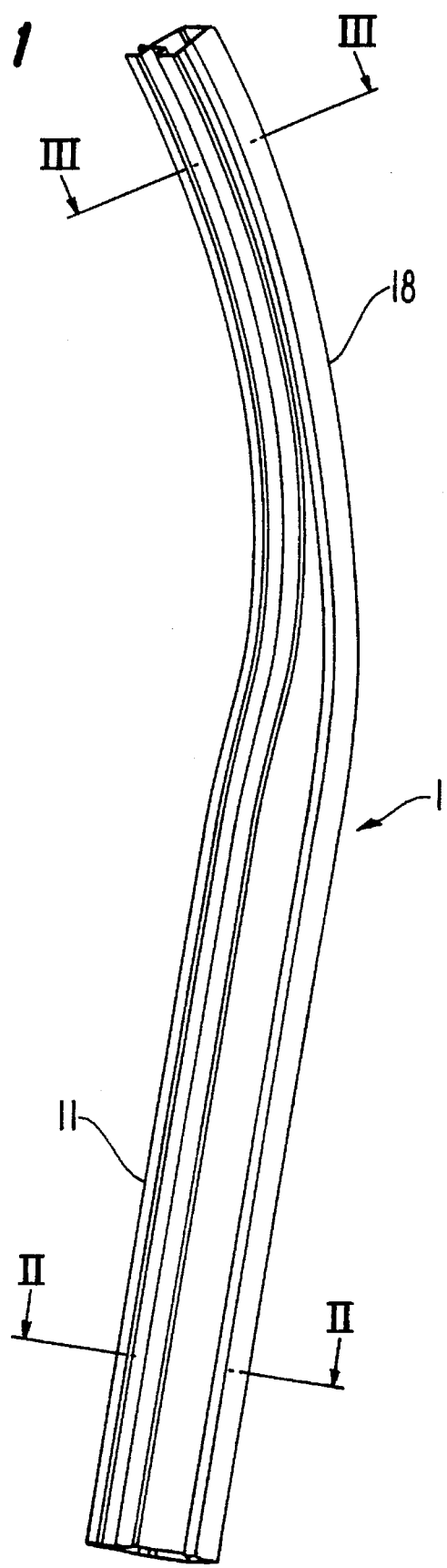
FIG. 1 is a schematic perspective view of a structural beam according to the invention.

Referring to FIG. 1, therein is illustrated a structural beam 1, intended by way of example as a middle door pillar or so-called B-post in a vehicle space frame, comprising a lower portion 11 extending substantially rectilinearly and an upper narrower portion 18 being slightly bent gradually to fit the contour of a door of the vehicle (not shown). The door pillar is provided as an integrated unitary shape extruded ready for use with all features, thus ensuring not only the final functional configuration of the pillar but also facilitating a following manufacturing step resulting in provision of the beam having a cross-sectional area that varies longitudinally thereof. A suitable material for extruding the beam is, e.g., aluminum or an alloy thereof or other light metal based materials, e.g., composites having light metal matrices.

Figure 2:
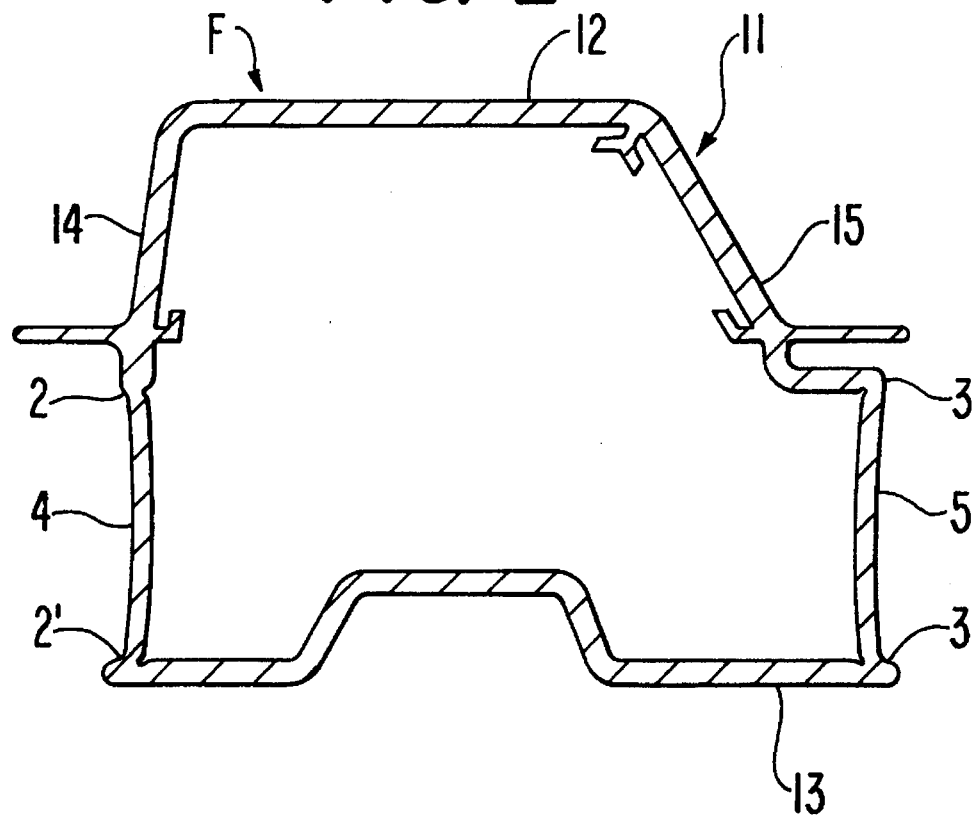
FIG. 2 is a cross-sectional view of the beam taken along line II—II in FIG. 1.

FIG. 2 illustrates the extended structural beam 1, in a cross-sectional view taken along line II—II in FIG. 1, as being a closed (box-section) shaped portion 11 having a cavity defined by a pair of substantially parallelly extending walls 12, 13 connected by means of transverse side walls 14, 15. The transverse cross-sectional configuration is continuous and seamless annularly. The transverse side walls 14, 15 are provided with grooves or grooves portions 2, 2' and 3, 3' defining slightly concave recesses and substantially parallelly extending wall portions 4, 5 having preferentially reduced wall thickness compared to the rest of the side walls 14, 15.

Figure 3:
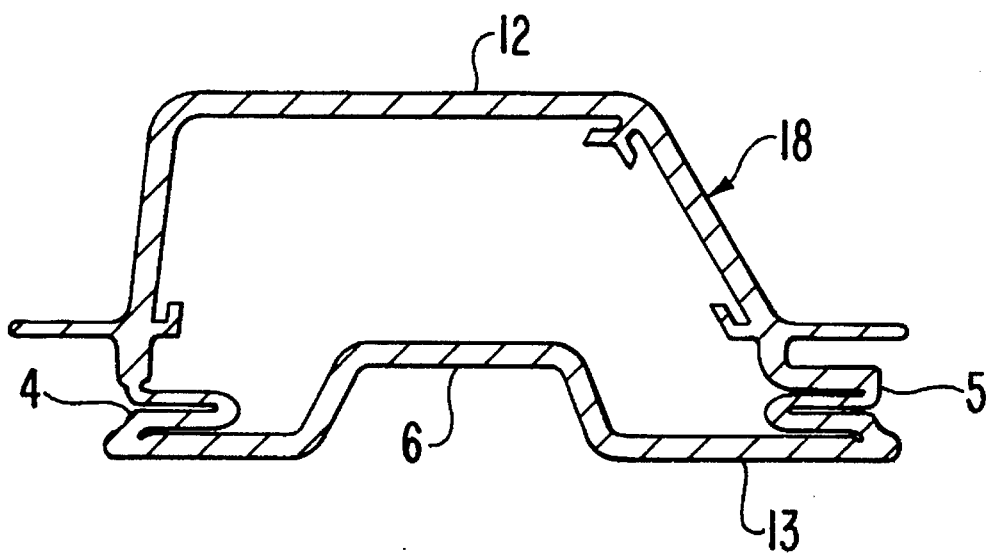
FIG. 3 is a cross-sectional view of a reduced area of the beam taken along line III—III in FIG. 1.

Application of a compression force F laterally of walls 12, 13 by means of any appropriate conventional pressure or rolling means/apparatus (not shown) along a predetermined part of the structural member causes the reduced thickness or weakened wall portions 4, 5 to fold in a controlled manner resulting in provision of a required cross-sectional area of the cavity of the beam, as illustrated in FIG. 3.

FIG. 3, illustrating the narrower portion 18 of the beam, shows that the distance between the parallel walls 12, 13 is reduced to a predetermined/required dimension defined by the height of folded wall portions 4, 5, without affecting the remaining configuration and dimensions of the shape, e.g., a longitudinally extending recessed cavity 6 in the bottom wall 12.

As is apparent from a consideration of FIGS. 1-3, the reduction in dimension of the upper length portion 18 is gradual from portion 11 to the upper end of the door pillar.

Depending on the actually employed deformation means (apparatus) and on the provision of preformed folding lines/grooves, it is possible to alternate the shape (configuration) of the structural member both dimensionally and directionally longitudinally thereof. The advantage of the above described manufacturing method is that the structural member could easily in one operation be adapted to a particular available space and/or to comply with different functional requirements and additional features along the longitudinal extension of the member.

Figure 4A:
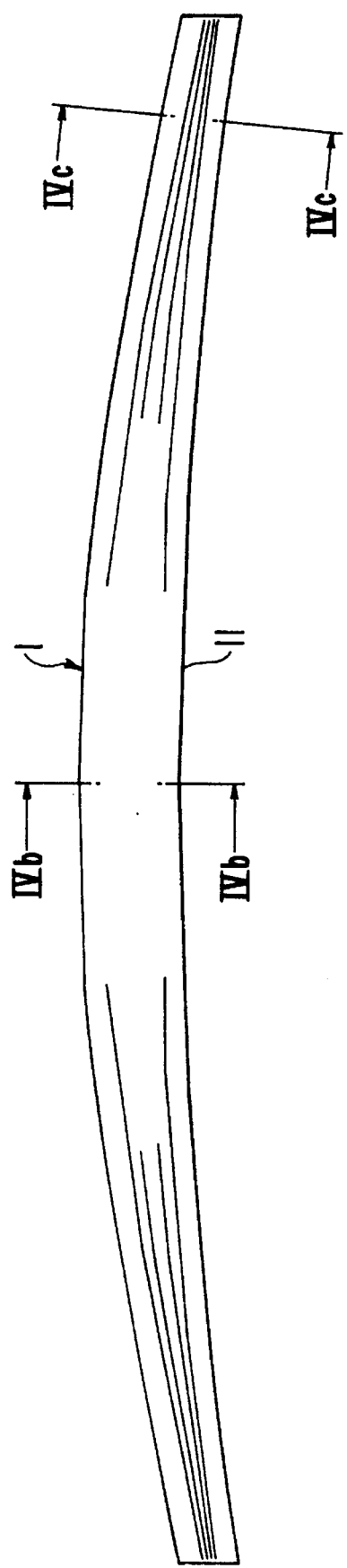
FIGS. 4a, 4b and 4c are views similar to FIGS. 1-3 but of another embodiment of a beam exhibiting cross-sectional variations along its longitudinal axis.
Figure 4C:
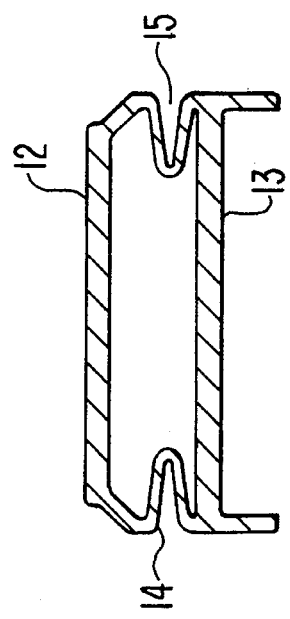
Figure 4B:
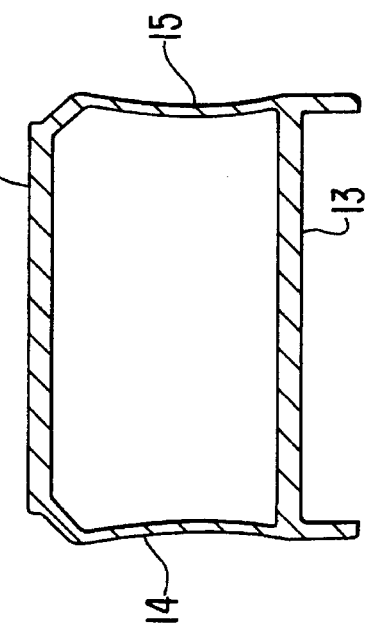

Another example of a structural beam provided according to the present invention is illustrated in FIGS. 4a–4c and is intended as a bumper for a vehicle. The bumper is shown as a longitudinal unitary extruded member 1 and includes a longitudinally central portion 11 of substantially rectangular and closed extruded cross-section (FIG. 4b) defined by a pair of parallelly extending walls 12, 13 connected by transverse side walls 14, 15 having reduced wall thickness. End portions of the beam, extending from opposite ends of the central portion 11, are of reduced cross-sectional area (FIG. 4c) and are formed by gradual folding of the transverse side walls 14, 15 and simultaneous bending gradually to provide an outer configuration of the bumper adapted to the contour of the particular vehicle. In order to increase the strength of the bumper, the folded side walls 14, 15 can be further reinforced, e.g., by means of welding or gluing (not shown).

Figure 5:
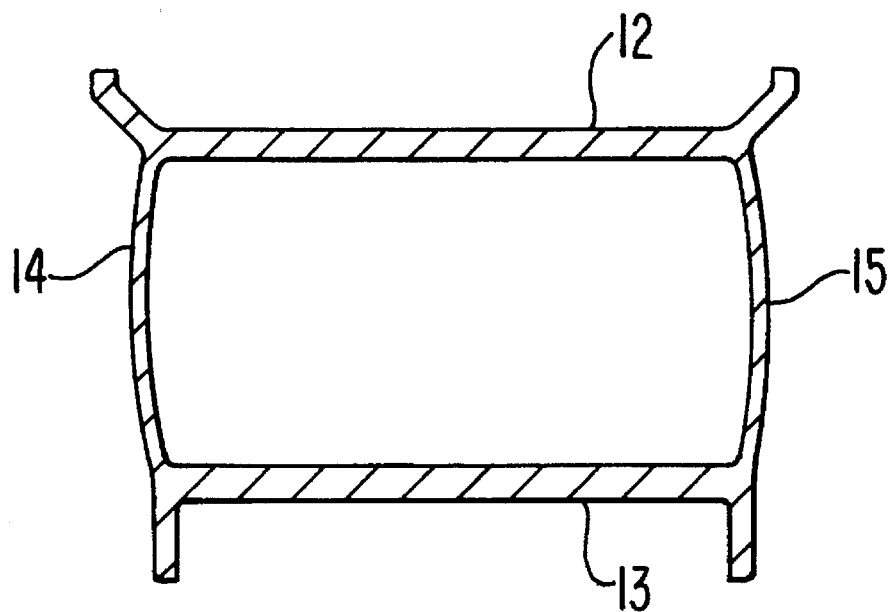

FIG. 5 is a cross-sectional view of an alternative configuration of the extruded member 1, e.g., the central part 11 shown in FIG. 4b. The transverse side walls 14, 15 connecting the parallelly extending walls 12, 13 are in this case slightly convex shaped, thus facilitating outward folding thereof to provide a required reduced cross-sectional area upon operation of applying pressure or rolling means (not shown).

The scope of the present invention is not limited to the above illustrated and described specific embodiments of the invention. Modifications may be made to the invention without departing from the fundamental inventive principle. Thus, e.g., other materials than the above mentioned aluminum (alloys) can be employed, and several modifications of the illustrated box section configurations of the beam could be employed for different specific types of application.

I claim:

1. A structural beam for use as a structural part of a motor vehicle, said structural beam comprising:

a one-piece elongated extruded member formed of an aluminum alloy;

said member having therethrough an elongated, laterally enclosed cavity defined by elongated side walls of said member including at least one pair of opposed, laterally spaced said side walls;

said member having a transverse cross-sectional configuration that is continuous and seamless annularly; and said member having at least one length portion whereat said cavity has a transverse cross-sectional area that is reduced compared to the cross-sectional area of at least one other portion of the length of said member, whereat at least portions of said one pair of side walls are of a wall thickness that is reduced compared to other of said side walls, and whereat said portions of said two side walls of reduced wall thickness have formed therein folds that extend parallel to a direction of elongation of said member, thereby defining a reduced dimension of said member in a direction transverse to said direction of elongation.

2. A structural beam as claimed in claim 1, wherein said one pair of side walls extend transversely of another pair of opposed, laterally spaced said side walls.

3. A structural beam as claimed in claim 1, wherein said one pair of side walls are formed entirely of said reduced wall thickness.

4. A structural beam as claimed in claim 1, wherein said one pair of side walls are concave and said folds are directed inwardly of said member.

5. A structural beam as claimed in claim 1, wherein said at least one length portion is curved gradually longitudinally.

6. A structural beam as claimed in claim 1, wherein said structural beam comprises a door pillar to be used in a space frame of the motor vehicle.

7. A structural beam as claimed in claim 6, wherein said length portion comprises an upper end of said door pillar.

8. A structural beam as claimed in claim 7, wherein said length portion is curved gradually upwardly.

9. A structural beam as claimed in claim 1, wherein said structural beam comprises a bumper to be used on the motor vehicle.

10. A structural beam as claimed in claim 9, wherein said member has a longitudinally central length portion and two end length portions extending from respective opposite ends of said central length portion, said one pair of side walls of said central length portion not being folded, and said one pair of side walls of said two end length portions being folded.

11. A structural beam as claimed in claim 10, wherein said two end length portions are curved gradually in opposite directions from said central length portion.

12. A structural beam as claimed in claim 10, wherein said folds of each said end length portion are of progressively increased depth in a direction away from said central length portion.

13. A structural beam as claimed in claim 1, wherein said reduced wall thickness portions of said one pair of side walls extend throughout the entire length of said member.

14. A structural beam as claimed in claim 1, wherein said reduced dimension of said member reduces gradually from said other portion of the length of said member to an end of said member.

15. A door pillar to be used in a space frame of a motor vehicle, said door pillar having upper and lower ends to be connected to the space frame, said door pillar comprising:

a one-piece elongated extruded member formed of an aluminum alloy;

said member having therethrough an elongated, laterally enclosed cavity defined by elongated side walls of said member including first and second pairs of opposed, laterally spaced said side walls, said first pair of side walls extending transversely of said second pair of side walls;

said member having a transverse cross-sectional configuration that is continuous and seamless annularly;

said member having an upper length portion whereat said cavity has a transverse cross-sectional area that is reduced compared to the cross-sectional area of the remainder of the length of said member and whereat said first pair of side walls have formed therein folds that extend parallel to a direction of elongation of said member, thereby defining a reduced dimension of said upper length portion of said member in a direction transverse to said direction of elongation; and said reduced dimension of said upper length portion of said member reducing gradually from said remainder of the length of said member to said upper end of said door pillar.

16. A door pillar as claimed in claim 15, wherein portions of said first pair of side walls having therein said folds are of a wall thickness that is reduced compared to a wall thickness of said second pair of side walls.

17. A door pillar as claimed in claim 16, wherein said reduced wall thickness portions extend throughout the entire length of said member.

18. A door pillar as claimed in claim 16, wherein said first pair of side walls are formed entirely of said reduced wall thickness.

19. A door pillar as claimed in claim 15, wherein said first pair of side walls are concave and said folds are directed inwardly of said member.

20. A door pillar as claimed in claim 15, wherein said upper length portion is curved gradually upwardly.

21. A method of manufacture of a structural beam for use as a structural part of a motor vehicle, said method comprising:

applying a deformation pressure to at least one length portion of a one-piece elongated extruded member formed of an aluminum alloy and having therethrough an elongated, laterally enclosed cavity defined by elongated side walls including at least one pair of opposed, laterally spaced said side walls that have portions that are of a wall thickness that is reduced compared to other of said side walls, said member having a transverse cross-sectional configuration that is continuous and seamless annularly; and said deformation pressure being applied to said length portion in a direction transverse to a direction of elongation of said member and parallel to a width dimension of said one pair of side walls, thereby causing formation, in said reduced wall thickness portions of said one pair of side walls of said at least one length portion, of folds that extend parallel to said direction of elongation, a reduction of transverse cross-sectional area of said cavity in said at least one length portion compared to at least one other portion of the length of said member, and a reduction of the dimension of said member in said direction of application of said deformation pressure.

22. A method as claimed in claim 21, wherein said deformation pressure is applied to another pair of opposed, laterally spaced said side walls that extend generally transverse to said one pair of side walls.

23. A method as claimed in claim 21, further comprising forming said one pair of side walls to be entirely of said reduced thickness.

24. A method as claimed in claim 21, comprising forming said one pair of side walls to be inwardly concave and thereby causing said folds to be directed inwardly of said member.

25. A method as claimed in claim 21, comprising curving said at least one length portion gradually longitudinally.

26. A method as claimed in claim 25, wherein said structural beam comprises a door pillar to be used in a space frame of the motor vehicle, and said curving comprises curving an upper end of said door pillar.

27. A method as claimed in claim 21, wherein said structural beam comprises a bumper of the motor vehicle, and comprising applying said deformation pressure to two end length portions of said member extending from respective opposite ends of a central length portion of said member, thereby causing formation of said folds in said one pair of side walls of said two end length portions, while not applying said deformation pressure to said central length portion.

28. A method as claimed in claim 27, comprising curving said two end length portions gradually in opposite directions from said central length portion.

29. A method as claimed in claim 27, comprising progressively increasing said deformation pressure in directions away from said central length portion.

30. A method as claimed in claim 21, further comprising forming said member by extrusion of said aluminum alloy such that said reduced thickness portions of said one pair of side walls extend throughout the entire length of said member.

31. A method as claimed in claim 21, comprising applying said deformation pressure such that said reduction in dimension of said member is gradual from said other portion of the length of said member to an end of said member.

32. A method as claimed in claim 21, further comprising, prior to said applying, extruding said member from said aluminum alloy.

33. A method of manufacture of a door pillar having upper and lower ends to be connected to a space frame of a motor vehicle, said method comprising:

applying a deformation pressure to an upper length portion of a one-piece elongated extruded member formed of an aluminum alloy and having therethrough an elongated, laterally enclosed cavity defined by elongated side walls including first and second pairs of opposed, laterally spaced said side walls with said first pair of side walls extending transversely of said second pair of side walls, said member having a transverse cross-sectional configuration that is continuous and seamless annularly;

said deformation pressure being applied to said upper length portion in a direction transverse to a direction of elongation of said member and parallel to a width dimension of said first pair of side walls, thereby causing formation in said first pair of side walls of folds that extend parallel to said direction of elongation, a reduction of transverse cross-sectional area of said cavity in said upper length portion compared to the remainder of the length of said member, and a reduction of the dimension of said upper length portion of said member in said direction of application of said deformation pressure; and said deformation pressure being applied such that said reduction of dimension of said upper length portion of said member is gradual from said remainder of the length of said member to said upper end of said door pillar.

34. A method as claimed in claim 33, comprising forming said folds in portions of said first pair of side walls that are of a wall thickness that is reduced compared to a wall thickness of said second pair of side walls.

35. A method as claimed in claim 34, further comprising forming said member by extrusion of said aluminum alloy such that said reduced thickness portions of said first pair of side walls extend throughout the entire length of said member.

36. A method as claimed in claim 34, further comprising forming said first pair of side walls to be entirely of said reduced thickness.

37. A method as claimed in claim 33, wherein said deformation pressure is applied to said second pair of side walls.

38. A method as claimed in claim 33, comprising forming said first pair of side walls to be concave inwardly and thereby causing said folds to be directed inwardly of said member.

39. A method as claimed in claim 33, further comprising curving said upper length portion gradually upwardly.

40. A method as claimed in claim 33, further comprising, prior to said applying, extruding said member from said aluminum alloy.

* * * * *